Dec. 1, 1953 D. W. LOCKWOOD ET AL 2,661,221
SAFETY PASSENGER HOLDING DEVICE FOR AUTOMOTIVE VEHICLES
Filed April 24, 1951
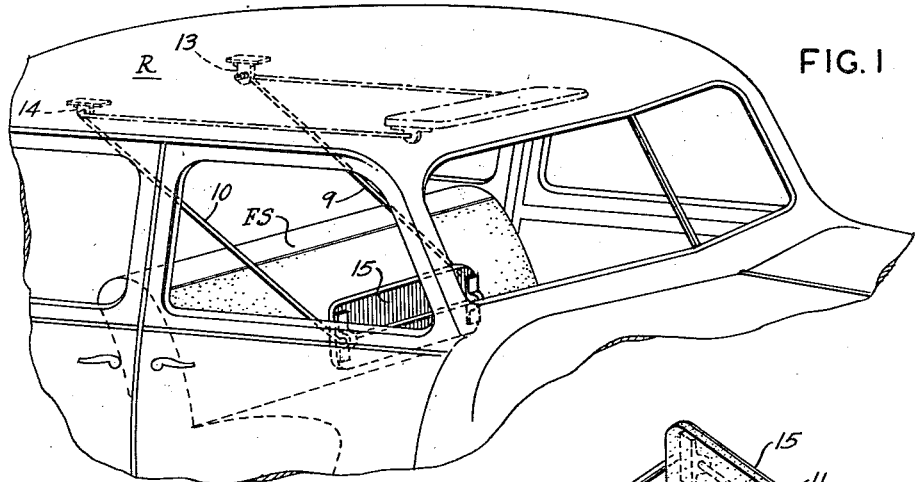
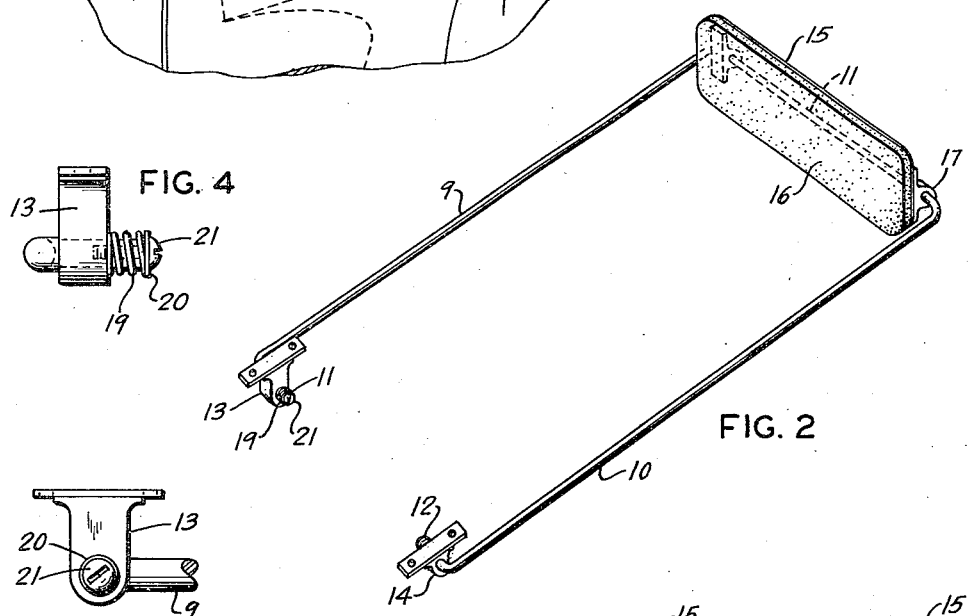
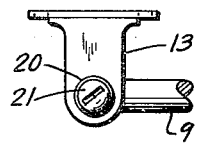
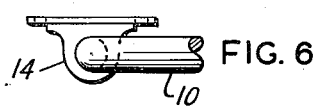
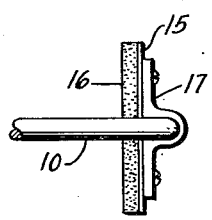
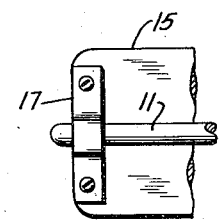
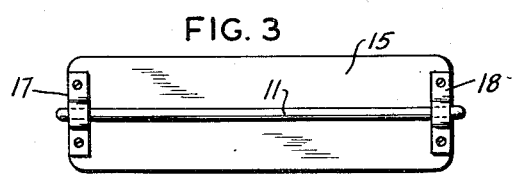
INVENTORS
DAVID W. LOCKWOOD
WESLEY E. BOWMAN
BY Wallace and Cannon
ATTORNEYS Patented Dec. 1, 1953

2,661,221

UNITED STATES PATENT OFFICE 2,661,221

SAFETY PASSENGER HOLDING DEVICE FOR AUTOMOTIVE VEHICLES

David W. Lockwood, Evanston, and Wesley E. Bowman, Kenilworth, Ill.

Application April 24, 1951, Serial No. 222,668

3 Claims. (Cl. 280—150)

1

This invention relates to a safety device adapted for use in an automotive vehicle.

In instances where automotive vehicles have been involved in collisions and similar accidents it has been observed that quite frequently the person seated next to the driver is thrown through the windshield of the vehicle, and this has often resulted in lacerations that have caused death. In view of this, it is the primary object of our invention to provide a safety device which will be effective to prevent a person seated adjacent to the driver being thrown through the windshield in the event of a collision or similar accident involving the automotive vehicle in which the device is installed.

Other objects of this invention are to provide a device of the aforesaid character which may be stored in an out-of-the-way position when not in use; to so relate the various elements of our device that the various parts may be disposed in the most advantageous position either when the device is in use or when it is disposed in an out-of-the-way position; to mount the device on the roof of an automotive vehicle and to so position it that a portion of the device may be disposed in front of the person seated next to the driver, and in such circumstances to pass portions of our device on each side of the person to be protected thereby; to frictionally retain the device in the aforesaid out-of-the-way position; and to provide a device of the aforesaid character that will be of simple and economical construction and effective in use.

Other and further objects of the present invention will be apparent from the following description and claims and are illustrated in the accompanying drawing which, by way of illustration, shows a preferred embodiment of the present invention and the principle thereof and what we now consider to be the best mode in which we have contemplated applying that principle. Other embodiments of the invention embodying the same or equivalent principle may be used and structural changes may be made as desired by those skilled in the art without departing from the present invention and the purview of the appended claims.

In the drawing:

Fig. 1 is a fragmentary perspective view of an automotive vehicle in which our safety device has been installed, and wherein the safety device is shown in full and dash lines in its operative position and in dot-dash lines in its inoperative position;

Fig. 2 is a perspective view of the device shown in Fig. 1;

2

Fig. 3 is an elevational view looking in at the right hand end of the apparatus as it is illustrated in Fig. 2;

Fig. 4 is a view looking toward the front of the automotive vehicle and showing the support for one end of the frame of our device;

Fig. 5 is a side view showing one of the brackets employed in our device and the connection therewith the frame;

Fig. 6 is an elevational view of another bracket employed in our device and showing the connection established thereto;

Fig. 7 is a fragmentary end elevational view, drawn to an enlarged scale, looking in at the left hand end of Fig. 3; and Fig. 8 is a view drawn to an enlarged scale of certain of the elements illustrated in Fig. 3.

The automotive vehicle with which our device is to be used includes a front seat FS which may be of the continuous type, as shown, or which may be of the split type. Our safety device is adapted to be disposed for use by the person seated next to the driver of the automotive vehicle and comprises a padded element that may be disposed in front of such person.

As illustrated, our device includes a substantially U-shaped frame embodying arms 9 and 10 and a flattened bight portion 11. The free ends of the arms 9 and 10 are bent to afford right angularly extending portions 11 and 12 which are respectively adapted to cooperate with brackets as 13 and 14 which are connected to the roof R of an automotive vehicle when our device is installed therein. In view of the arcuate configuration of the roofs of automotive vehicles with the highest portion adjacent the center of the vehicle, the bracket as 13 that is to be disposed in the inner position is longer than the bracket 14 which is to be disposed adjacent a side wall of the vehicle and this difference in the size of the brackets insures that the arms 9 and 10 may be maintained in parallel relation.

Our device also embodies a flat metallic plate 15 on one face of which a padding of sponge rubber or like material is secured. The bight portion 11 of the frame of our device has opposite end portions thereof extended through brackets as 17 and 18 which are secured to the face of the plate 15 opposite that on which the padding 16 is mounted, said brackets being respectively located at the ends of the plate 15. In this manner the plate 15 and the padding 16 are pivotally connected to the frame of our device so that the plate 15 and the padding 16 may be disposed in a generally horizontal position when our device is to be disposed in an out-of-the-way position adjacent to the roof of the automotive vehicle in the position shown in dot-dash lines in Fig. 1. In order to insure that our device will remain in this position a spring as 19 is disposed about the end portion 11 extended inwardly of the bracket 13 and has one end thereof engaged with the bracket while the other end thereof engages a washer 20 that is secured to the portion 11 by a screw 21 or the like. A spring and washer arrangement like that just described is also associated with the bracket 14 and these arrangements are effective to impose a frictional drag on the frame of our device so as to thereby retain the same in the aforesaid out-of-the-way position. Of course, if desired, resort may be had to a suitable latch arrangement to retain the frame in this out-of-the-way position.

When our device is to be put to use it is pivoted from the aforesaid out-of-the-way position in the position shown in full and dash lines in Fig. 1, and in such circumstances, the plate 15 and the padding 16 thereon are disposed in a generally vertical position. The arms 9 and 10 respectively pass on each side of the person seated in the automotive vehicle next to the driver thereof and this disposes the plate 15 in spaced position in front of such person. The spacing between the arms 9 and 10 is such that freedom of movement is afforded to the person seated between these arms and the length of the arms and the connection thereof to the roof R is such that the plate 15 and padding 16 are disposed forwardly of the person to permit freedom of movement. However, because the plate 15 and padding 16 are disposed between the person seated next to the driver and the windshield, the plate 15 and padding 16 will be effective to prevent a person seated next to the driver of an automotive vehicle from being thrown through a windshield in the event of a collision or similar accident involving the automotive vehicle.

Moreover, since the arm 10 is disposed between the person seated next to the driver and the adjacent door of the vehicle, this arm is effective to prevent such person from falling through the door in the event of inadvertent opening thereof.

It will be manifest from the foregoing description that we have afforded a device which will enable the hereinabove set forth and kindred objects of this invention to be realized and while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A safety device for use by a person on a seat in an automotive vehicle comprising a frame including spaced apart rigid arms, a mounting means on the roof of the vehicle to the rear of the seat, end portions of the arms being pivotally connected with the mounting means, a supported padding pivotally mounted adjacent the opposite end portions of the arms remote from the mounting means, the arms being adapted to extend past the seated person with the padding disposed in front of the person, the positioning of the mounting means with the arms pivotally connected thereto rearwardly of the seat and extending past the person and the padding which absorbs produced shock serving to confine and prevent the person from being thrown forwardly in the vehicle, and friction means associated with the pivotal connection for maintaining the frame substantially parallel with the vehicle roof when not in use.

2. A safety device as defined in and by claim 1 wherein the said mounting means comprises a pair of brackets affixed to the roof of the vehicle with each rigid arm respectively connected with each bracket, and spring means on each arm adjacent each bracket for producing a drag on the frame to maintain the frame substantially parallel with the vehicle roof when not in use.

3. A safety device for use by a person on a seat in an automotive vehicle comprising a frame including spaced apart rigid arms, a mounting means on the vehicle structure to the rear and above the seat, end portions of the arms being pivotally connected with the mounting means, a protective element pivotally mounted adjacent the opposite end portions of the arms remote from the mounting means, the arms being adapted to extend past the seated person with the protective element disposed in front of the person, the positioning of the mounting means with the arms pivotally connected thereto rearwardly of the seat and extending past the person and the protective element which absorbs produced shock serving to confine and prevent the person from being thrown forwardly in the vehicle, and means associated with the pivotal connection of said arms with the mounting means for maintaining the frame transversely to and above the seat when not in use.

DAVID W. LOCKWOOD.
WESLEY E. BOWMAN.

References Cited in the file of this patent

UNITED STATES PATENTS

| Number | Name | Date |
|---|---|---|
| 1,694,095 | Du Moulim | Dec. 4, 1928 |
| 2,337,480 | Logan | Dec. 21, 1943 |
| 2,349,109 | O'Keeffe | May 16, 1944 |

FOREIGN PATENTS

| Number | Country | Date |
|---|---|---|
| 534,769 | France | Jan. 12, 1922 |
| 769,903 | France | June 18, 1934 |